US007489956B2

(12) United States Patent
Zou

(10) Patent No.: US 7,489,956 B2
(45) Date of Patent: *Feb. 10, 2009

(54) FOLDABLE MOBILE TELEPHONE WITH MOVABLE HINGE

(75) Inventor: Zhi-Gang Zou, Shenzhen (CN)

(73) Assignees: Shenzhen Futalhong Precision Industrial Co., Ltd., Shenzhen City, Guangdong Province (CN); Sutech Trading Limited, Tortola (VG)

( * ) Notice: Subject to any disclaimer, the term of this patent is extended or adjusted under 35 U.S.C. 154(b) by 664 days.

This patent is subject to a terminal disclaimer.

(21) Appl. No.: 11/107,676

(22) Filed: Apr. 15, 2005

(65) Prior Publication Data

US 2005/0243997 A1 Nov. 3, 2005

(30) Foreign Application Priority Data

Apr. 30, 2004 (TW) ............................. 93206729 U

(51) Int. Cl.
*H04M 1/10* (2006.01)
(52) U.S. Cl. ............. 455/575.3; 455/575.1; 455/575.2; 379/433.13
(58) Field of Classification Search ............. 455/575.3, 455/575.1; 379/433.13
See application file for complete search history.

(56) References Cited

U.S. PATENT DOCUMENTS

2004/0077199 A1* 4/2004 Winstead et al. ............ 439/165
2006/0148542 A1* 7/2006 Oliver .................... 455/575.3

* cited by examiner

*Primary Examiner*—Matthew D Anderson
*Assistant Examiner*—Adel Youssef
(74) *Attorney, Agent, or Firm*—Morris Manning Martin LLP; Tim Tingkang Xia

(57) ABSTRACT

A foldable mobile telephone includes a first housing (10), a second housing (20), a connecting unit (30) and two turning shafts (40). The connecting unit includes a first connecting block (304), a second connecting block (306) and a hinge (302). The first connecting block and the second connecting block are coupled together via the hinge. The connecting unit is connected with the first and second housings and through the turning shafts. The first housing is connected with the first connecting block. The second housing is connected with the second connecting block. The first housing is pivotable about the second housing via the hinge at either of two sides of the foldable mobile telephone. The connecting unit can turn relative to the first and second housings through the turning shafts. Therefore, the foldable mobile telephone can be opened breadthwise or lengthwise as desired for improved operability and convenience.

19 Claims, 7 Drawing Sheets

FOLDABLE MOBILE TELEPHONE WITH MOVABLE HINGE

BACKGROUND OF THE INVENTION

1. Field of the Invention

The present invention relates to foldable mobile telephones, and particularly to a foldable mobile telephone which can be hinged at any of plural locations by the same hinge thereof.

2. Description of the Related Art

Nowadays, foldable mobile telephones are being utilized by a large number of private and business users. These mobile telephones are compact and easy to carry when folded. In addition, the keypad is located inside the folded mobile telephone, and is thus protected from inadvertent operation and damage.

As the technology of mobile telephones advances, numerous different functional software is being incorporated into them, such as on-line games. In fact, on-line game software is now considered by many to be a mainstream application. Network game development companies are continually introducing various new on-line network games in prolific quantities, and these network games now occupy a significant market position. In addition, the plethora of available on-line games is attracting an increasing number of users.

Accordingly, mobile telephones are increasingly being developed with game playing functions. Many currently available mobile telephones have pre-installed game software, and can download new games from sources such as a network to provide even further recreation.

As one example in the art, Nokia Corporation has produced a game mobile telephone known as N-Gage. The shape of N-Gage is substantially quadrate. A screen is arranged in a middle of a main body of the mobile telephone. A split keypad is arranged on two sides of the screen. However, the size of the mobile telephone is rather large. For example, it is not very comfortable to hold the mobile telephone when phoning.

As another example in the art, Sony Ericsson Corporation provides a game mobile telephone marketed under the model number Z608. The mobile telephone has an external gameboard for playing games. When users want to play games, it is necessary to connect the gameboard to a housing of the mobile telephone through a connector. However, the gameboard is not convenient to carry. In addition, repeated connecting and disconnecting of the connector may eventually weaken the connection and adversely affect the operation of playing games.

Therefore, a foldable mobile telephone which overcomes the above-described disadvantages is desired.

SUMMARY

It is therefore object of the invention is to provide a foldable mobile telephone on which games can be conveniently played and which can be conveniently carried.

To achieve the above-mentioned object, a foldable mobile telephone of the present invention includes a first housing, a second housing, a connecting unit and two turning shafts. The connecting unit includes a first connecting block, a second connecting block and a hinge. The first connecting block and the second connecting block are coupled together via the hinge. The connecting unit is movably connected with the first and second housings through the turning shafts. The first housing is connected with the first connecting block. The second housing is connected with the second connecting block. The first housing is pivotable about the second housing via the hinge at either of two sides of the foldable mobile telephone.

The connecting unit can turn relative to the first and second housings through the turning shafts. Therefore, the foldable mobile telephone can be opened breadthwise or lengthwise as desired. The operability and convenience of the foldable mobile telephone are thus improved.

Other objects, advantages and novel features of the invention will become more apparent from the following detailed description when taken in conjunction with the accompanying drawings, in which:

DETAILED DESCRIPTION OF THE EMBODIMENTS

Figure 1:
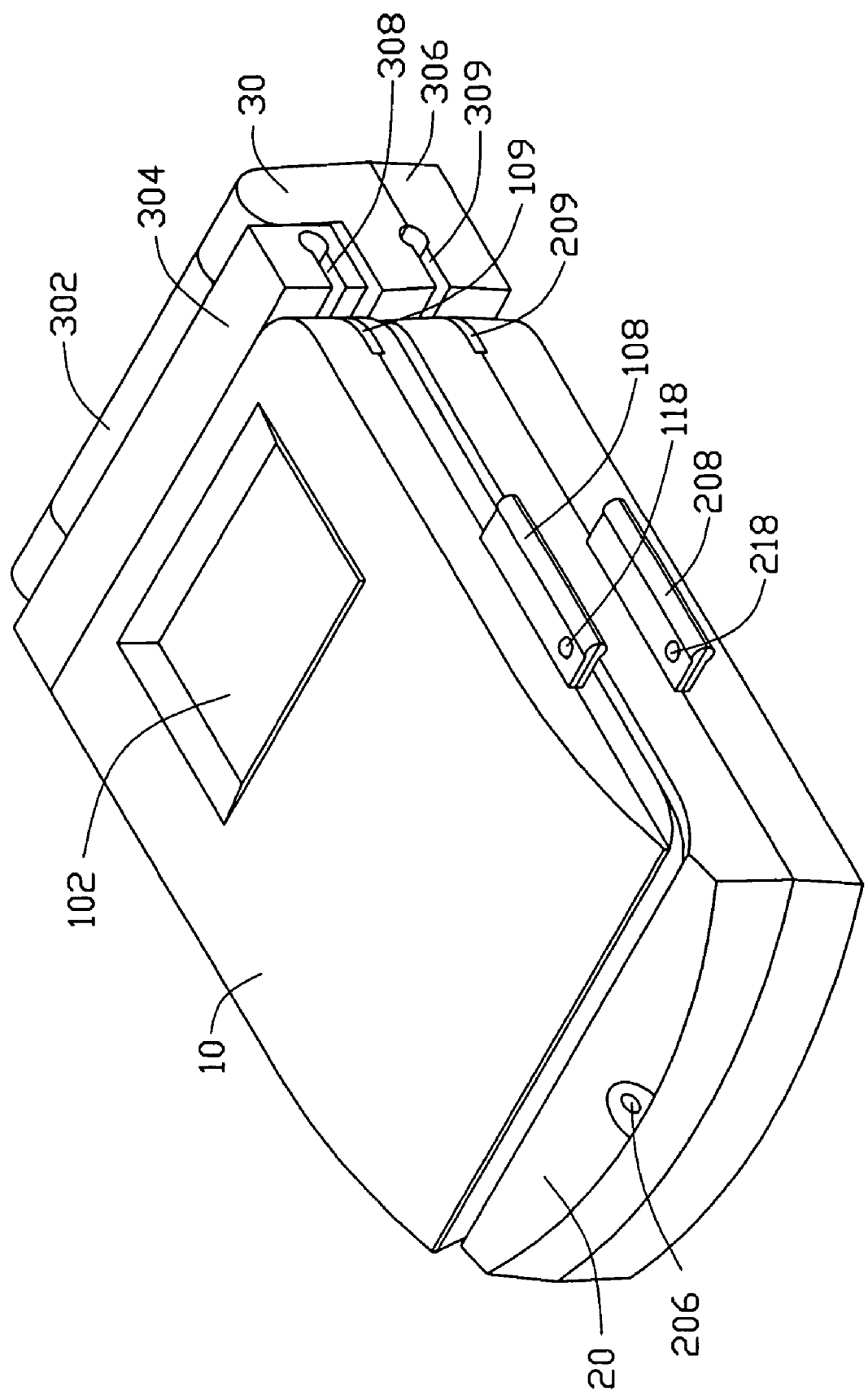
FIG. 1 is an isometric view of a foldable mobile telephone according to a preferred embodiment of the present invention, showing the foldable mobile telephone in a first folded state.
Figure 3:
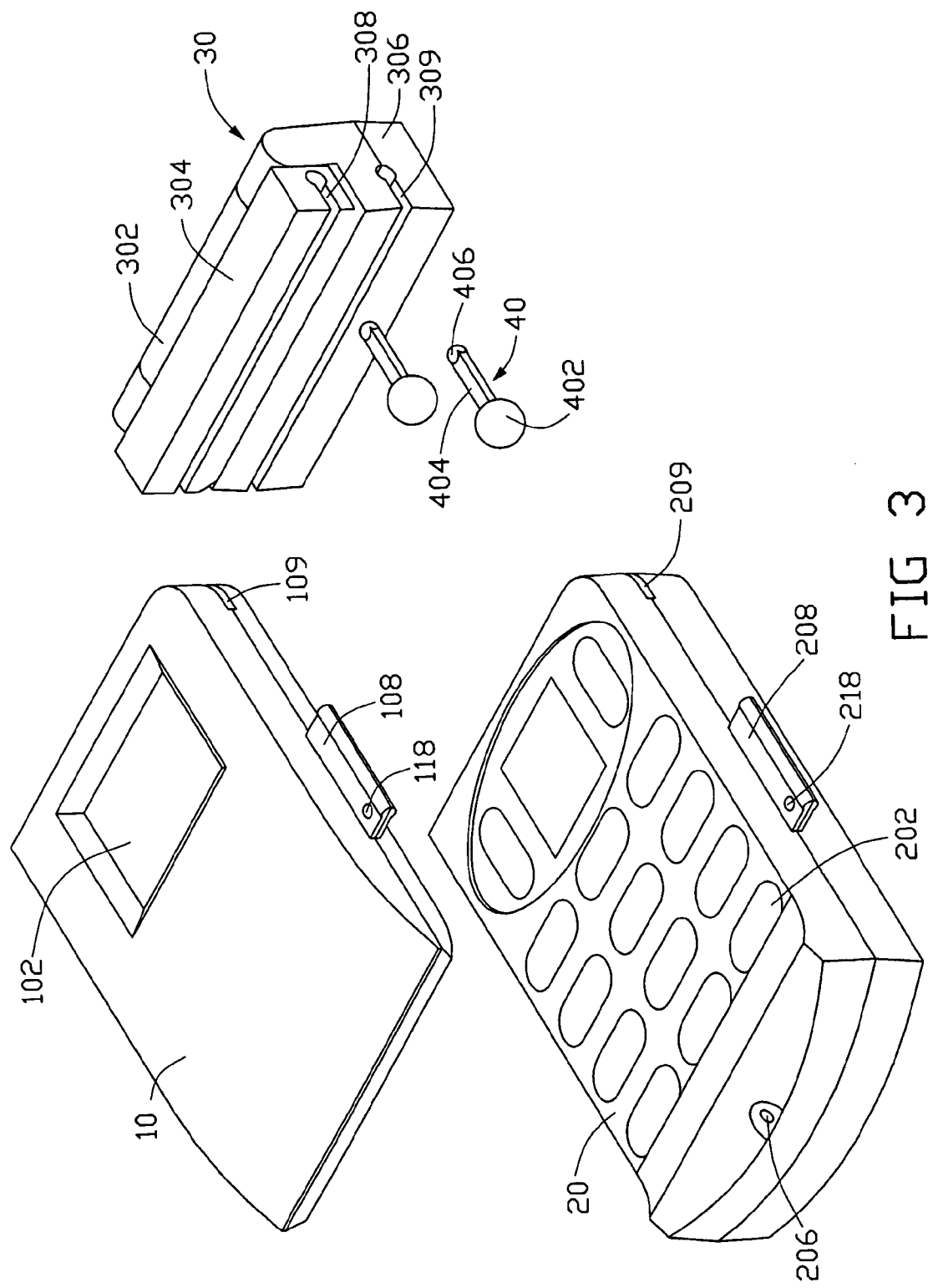
FIG. 3 is an exploded view of the foldable mobile telephone of FIG. 1.
Figure 5:
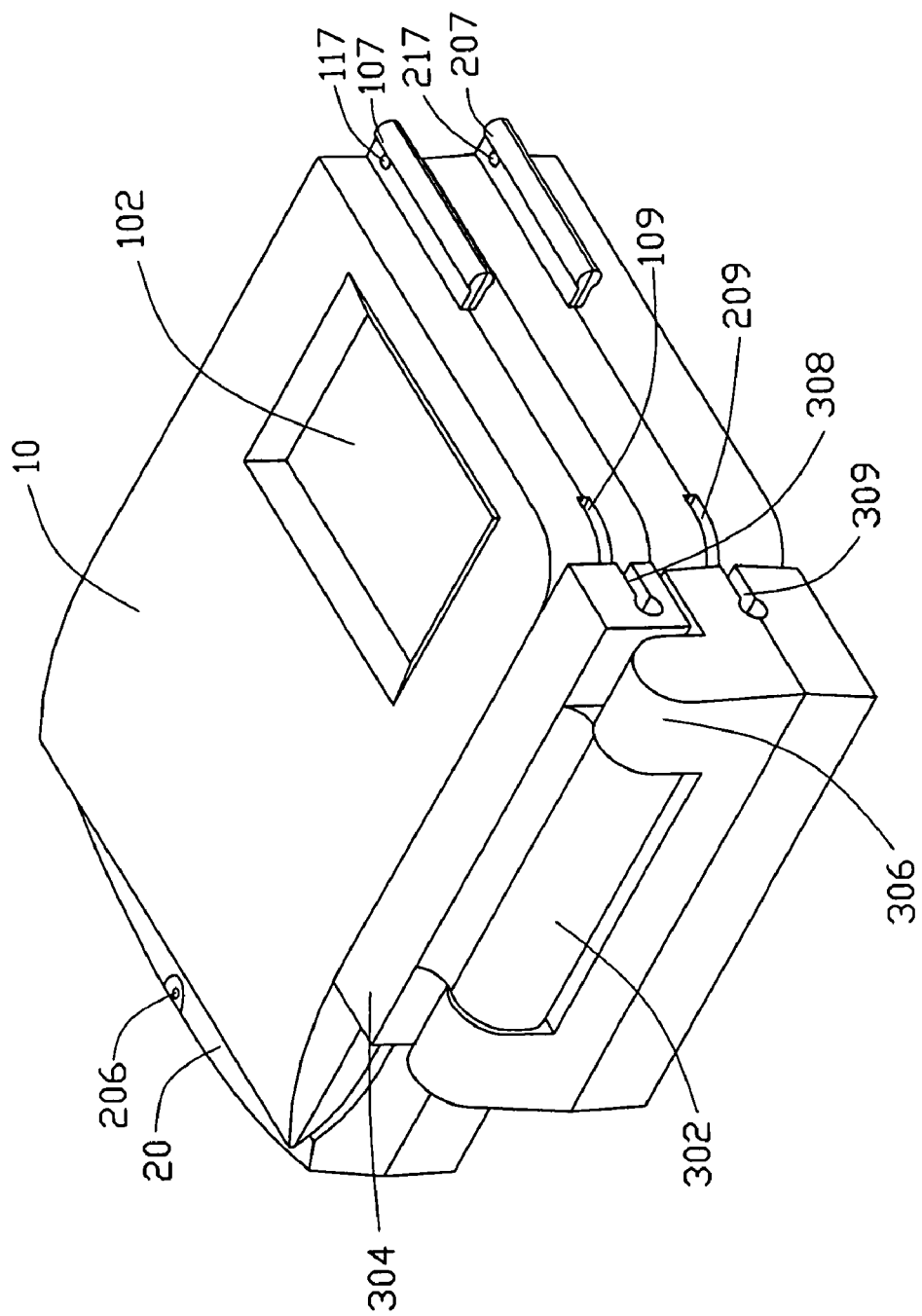
FIG. 5 is an isometric view of the foldable mobile telephone according to the preferred embodiment of the present invention, showing the foldable mobile telephone in a second folded state.

Referring to FIG. 1 and FIG. 3, a foldable electronic device like a foldable mobile telephone according to the preferred embodiment of the present invention includes a first housing 10, a second housing 20, a connecting unit 30 and two turning shafts 40. The connecting unit 30 is connected with the first and second housings 10, 20 through the turning shafts 40. The connecting unit 30 has, inter alia, a first position (see FIG. 1) and a second position (see FIG. 5).

Figure 2:
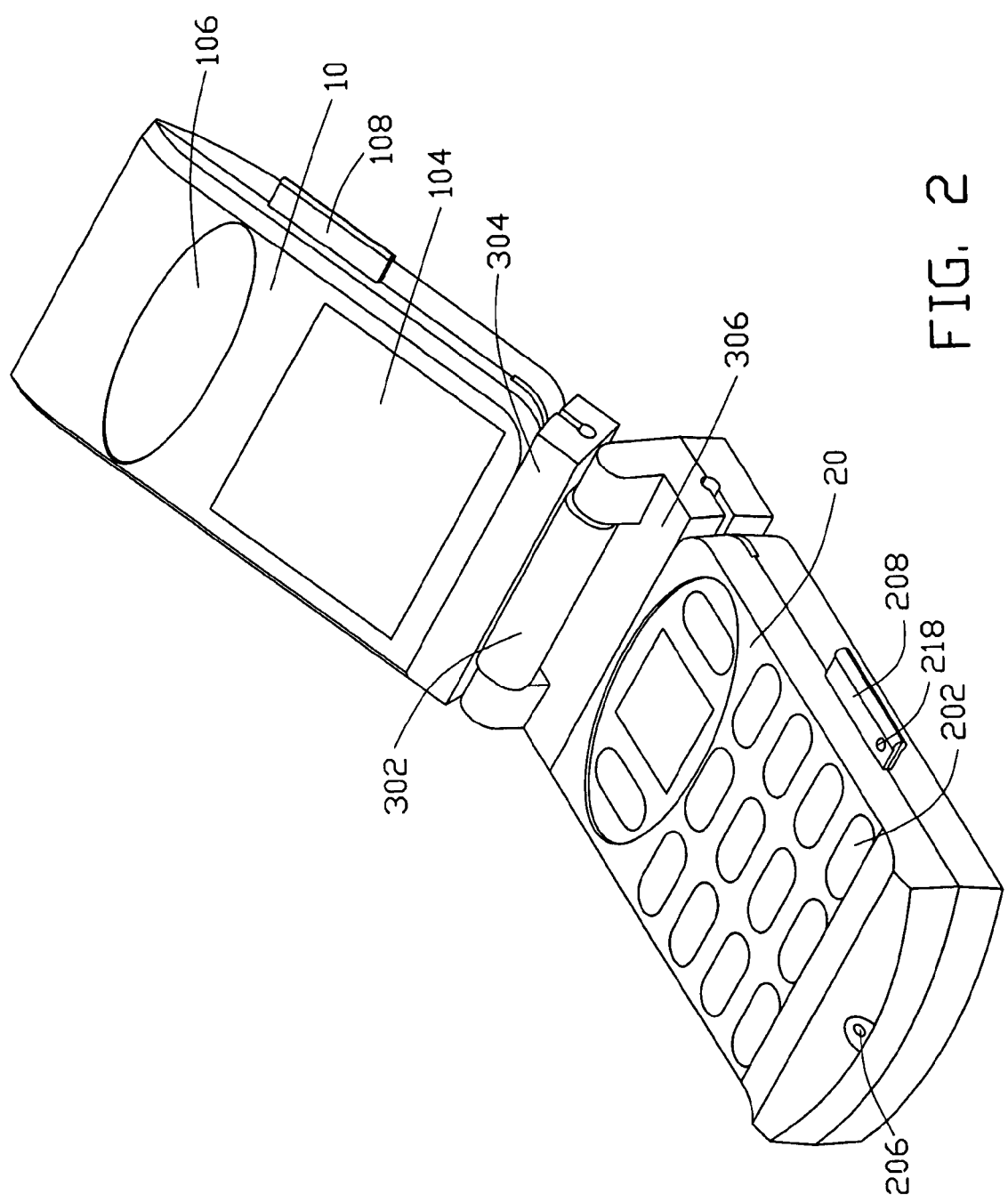
FIG. 2 is similar to FIG. 1, but showing the foldable mobile telephone in a first unfolded state.
Figure 4:
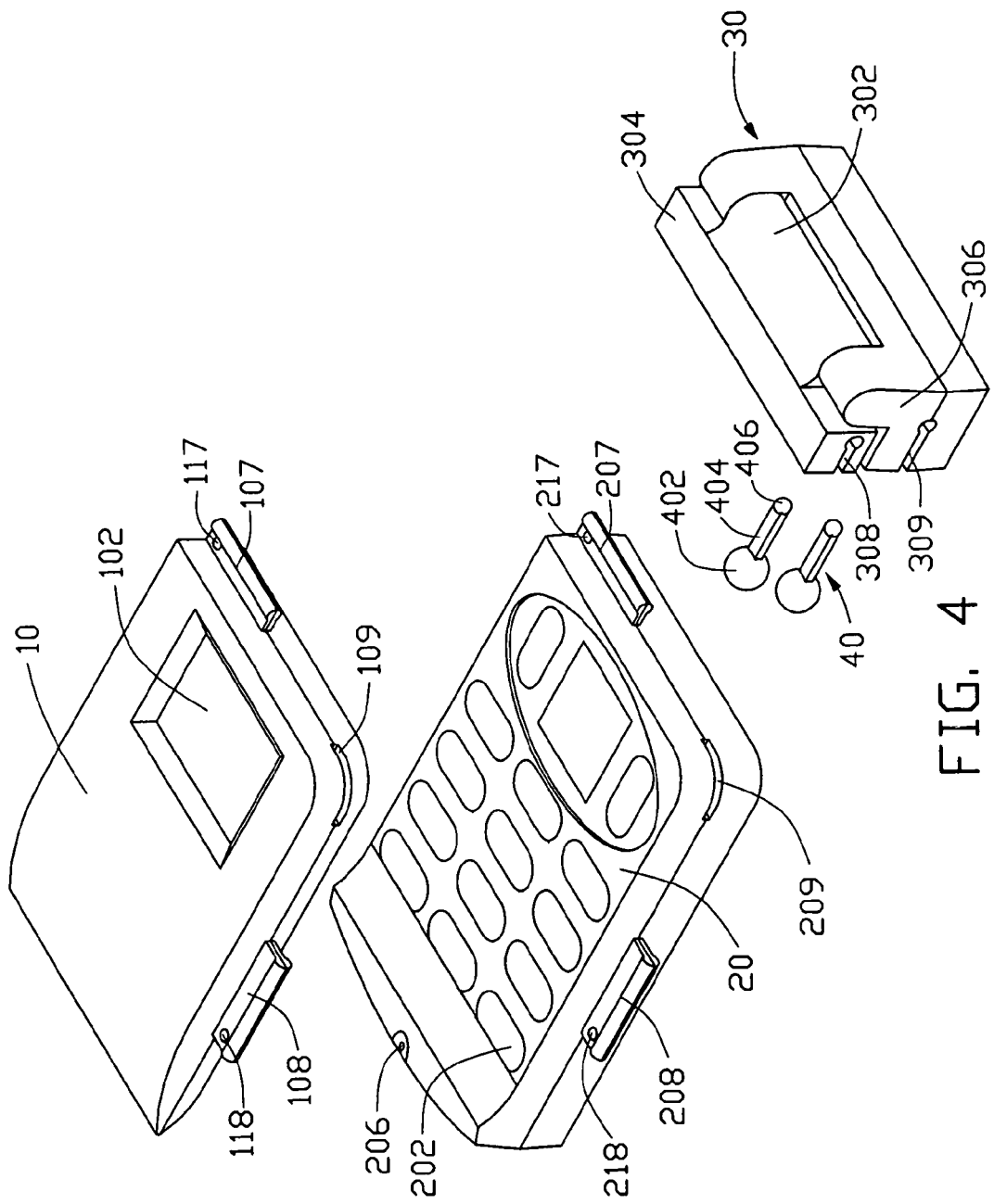
FIG. 4 is similar to FIG. 3, but viewed from another aspect.

Referring also to FIG. 2 and FIG. 4, the first housing 10 includes a first display 102 and a second display 104. The first display 102 is arranged so as to be located at an outer side when the foldable mobile telephone is folded. The outer side refers to an upper side of the first housing 10 distal from the second housing 20 when the foldable mobile telephone is folded. The second display 104 is arranged so as to be located at an inner side when the foldable mobile telephone is folded. The inner side refers to the side where the first housing 10 and the second housing 20 abut against each other when the foldable mobile telephone is folded. A speaker 106 used in conversation is provided in the first housing 10 adjacent the second display 104. A projection 107 extends from a top side of the first housing 10. A projection 108 extends from a right side of the first housing 10. A slot 109 is defined in a top, right side corner of the first housing 10, between the projections 107, 108. A distal edge portion of each of the projections 107, 108 is essentially in the form of an enlarged round rod. A bulge 117 is provided on one side of the projection 107 for orientation. A bulge 118 is provided on one side of the projection 108 for orientation. The bulges 117, 118 are elastic and smooth.

The second housing 20 includes a keypad 202 arranged so as to be located at an inner side of the second housing 20 when the foldable mobile telephone is folded. The keypad 202 has a plurality of keys (not labeled). Some of the keys have different functions between the connecting unit 30 in the first position (see FIG. 2) and in the second position (see FIG. 7). And this can be accomplished using hardware and/or software in many different ways. A mouthpiece microphone 206 used in conversation is provided below the keypad 202. A projection 207 extends from a top side of the second housing 20. A projection 208 extends from a right side of the second housing 20. A slot 209 is defined in a top, right side corner of the second housing 20 between the projections 207, 208. A distal edge portion of each of the projections 207, 208 is essentially in the form of an enlarged round rod. A bulge 217 is provided on one side of the projection 207 for orientation. A bulge 218 is provided on one side of the projection 208 for orientation. The bulges 217, 218 are elastic and smooth.

The connecting unit 30 includes a hinge 302, a first connecting block 304, and a second connecting block 306. The first connecting block 304 and the second connecting block 306 are coupled together via the hinge 302. The connecting unit 30 has a foldable configuration through movement of the hinge 302. A first channel 308 is defined in the first connecting block 304. A second channel 309 is defined in the second connecting block 306. An inmost portion of each of the channels 308, 309 is essentially in the form of an enlarged cylindrical passage. The inmost portion of the first channel 308 can slidably receive the distal edge portions of the projections 107, 108. The inmost portion of the second channel 309 can slidably receive the distal edge portions of the projections 207, 208. A width of the first channel 308 is roughly equal to or slightly larger than a thickness of the projections 107, 108. A width of the second channel 309 is roughly equal to or slightly larger than a thickness of the projections 207, 208. Thus the projections 107, 108 can slide in the first channel 308, and the projections 207, 208 can slide in the second channel 309. A dent (not visible) is provided in an inside surface of the first channel 308, for accepting the bulges 117, 118. Another dent (not visible) is provided in an inside surface of the second channel 309, for accepting the bulges 217, 218.

Each turning shaft 40 comprises a large first sphere 402, a small second sphere 406, and a shaft 404. The first sphere 402 is connected with the second sphere 406 through the shaft 404. The first spheres 402 of the turning shafts 40 are respectively located inside the first and second housings 10, 20 at the slots 109, 209, and can move within the first and second housings 10, 20. The shafts 404 extend out from the slots 109, 209. A diameter of the first spheres 402 is larger than a width of the slots 109, 209, so that the first spheres 402 cannot separate from the first and second housings 10, 20. The second spheres 406 are respectively located in the inmost portions of the channels 308, 309, and can slide therealong. The width of the channels 308, 309 is smaller than a diameter of the second spheres 406, so that the second spheres 406 cannot transversely separate from the connecting blocks 304, 306 when sliding in the inmost portions of the channels 308, 309. Further, the second spheres 406 are elastic, and the diameter of the second spheres 406 is preferably slightly larger than a diameter of the inmost portions of the channels 308, 309. This can help ensure that the second spheres 406 do not exit ends of the inmost portions of the channels 308, 309 when sliding along the inmost portions of the channels 308, 309. The shafts 404 can slide within the channels 308, 309.

A flexible cable (not shown) to establish electrical connection between the first and second housings 10, 20 is incorporated in the hinge 302. One end of the flexible cable is connected with a circuit board of the first housing 10. The other end of the flexible cable is connected with a circuit board of the second housing 20. The flexible cable extends through the turning shaft 40 which connects the first housing 10 and the first connecting block 304, the hinge 302, and the turning shaft 40 which connects the second housing 20 and the second connecting block 306, in that order.

When the connecting unit 30 is in the first position, the bulges 117, 217 are respectively engaged in the dents of the inside surfaces of the channels 308, 309. The foldable mobile telephone can be folded and unfolded about an axis at its top side through movement of the hinge 302. The unfolded state of the foldable mobile telephone is shown in FIG. 2. The keypad 202 is operated lengthwise and the first housing 10 is at a first operational location to use the displays 102, 104.

Figure 6:
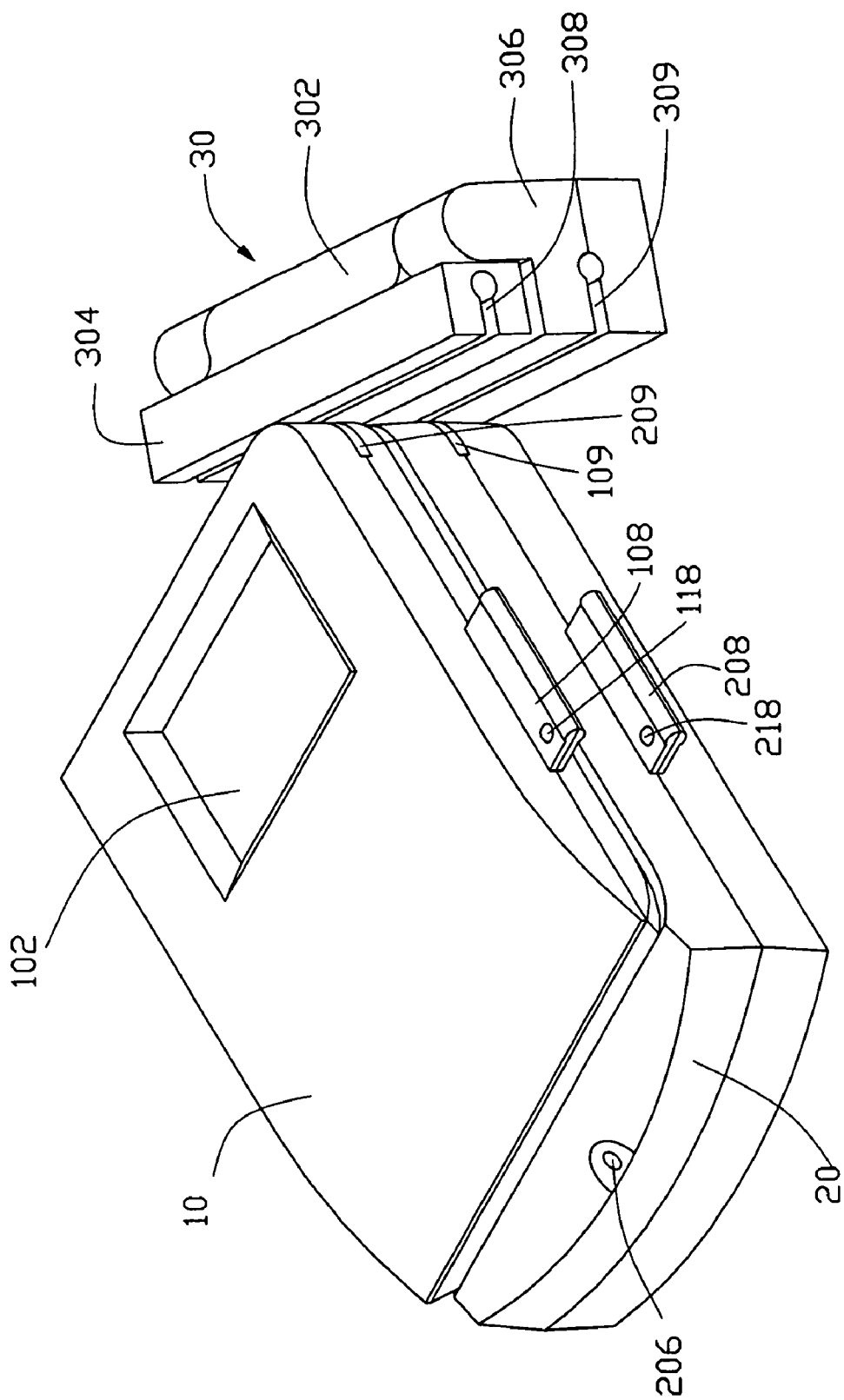
FIG. 6 is similar to FIG. 1, but showing the foldable mobile telephone being adjusted from the first folded state to the second folded state.
Figure 7:
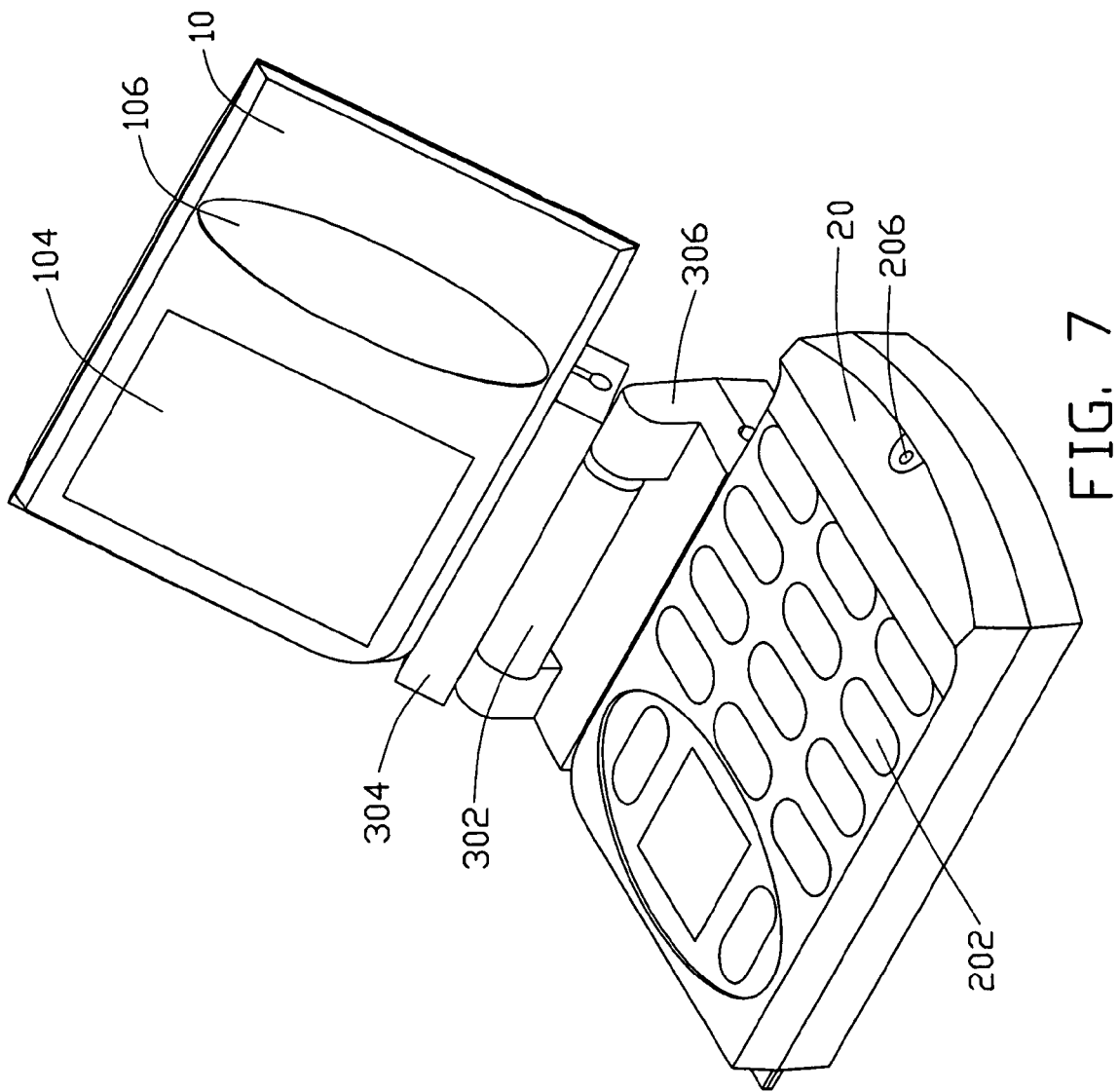
FIG. 7 is similar to FIG. 5, but viewed from another aspect and showing the foldable mobile telephone in a second unfolded state.

To move the connecting unit 30 from the first position to the second position, the connecting unit 30 is gripped by a user and pulled rightward. The elastic bulges 117, 217 disengage from the dents of the channels 308, 309. Subsequently, the projections 107, 207 exit the channels 308, 309. Then the connecting unit 30 is pulled around the top, right side corner of the foldable mobile telephone (see FIG. 6). The connecting unit 30 cannot separate from the first and second housings 10, 20 because of the interconnection provided by the turning shafts 40. The first spheres 402 can turn within the first and second housings 10, 20, and the shafts 404 can turn in the slots 109, 209. Therefore, the connecting unit 30 can turn relative to the first and second housings 10, 20. Then the connecting unit 30 is pulled bottomward, and the projections 108, 208 enter the channels 308, 309. Subsequently, the elastic bulges 118, 218 engage in the dents of the channels 308, 309. The connecting unit 30 is thus held in the second position (see FIG. 5). The foldable mobile telephone can be folded and unfolded about the same axis located at its right side through movement of the hinge 302. The unfolded state of the foldable mobile telephone is shown in FIG. 7 and the first housing 10 is at a second operational location to use the displays 102, 104. Because the keypad 202 is arranged breadthwise relative to the second display 104, it is convenient to operate the keypad 202 breadthwise with two hands when performing activities such as playing games. Therefore, the operability and convenience of the foldable mobile telephone are improved.

Furthermore, if desired, when starting from the first position, the first housing 10 and the connecting unit 30 can be gripped together. Then the first housing 10 and the connecting unit 30 are pulled and turned in unison relative to the second housing 20, through the cooperation of the turning shaft 40 that connects between the second connecting block 306 and the second housing 20. In this way, the foldable mobile telephone can be moved into a third position. In the third position, not only is the keypad 202 arranged breadthwise relative to the second display 104, but the second display 104 itself is also arranged breadthwise. In similar fashion, if desired, when starting from the first position, the second housing 20 and the connecting unit 30 can be gripped together. Then the second housing 20 and the connecting unit 30 are pulled and turned in unison relative to the first housing 10, through the cooperation of the turning shaft 40 that connects between the first connecting block 304 and the first housing 10. In this way, the foldable mobile telephone can be moved into a fourth position. In the fourth position, the keypad 202 is arranged lengthwise relative to the second display 104, and the second display 104 itself is also arranged lengthwise.

It is to be understood that the elastic bulges 117, 118, 217, 218 can be configured as hollow elastic protrusions. For example, base portions of the protrusions are fixed to the projections 107, 108, 207, 208, and distal surfaces of the protrusions are smooth for easy sliding. In one embodiment, the protrusions can have a kind of "omega" (Ω) configuration. Furthermore, the elastic bulges 117, 118, 217, 218 can be configured as spring-loaded ball bearings contained in sockets of the projections 107, 108, 207, 208.

It is to be further understood that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A foldable mobile telephone comprising: a first housing; a second housing; and a connecting unit, the connecting unit comprising a first connecting block, a second connecting block and a hinge, the first connecting block and the second connecting block being coupled together via the hinge, a flexible cable to establish electrical connection between the first and second housings being incorporated in the hinge, two electrical connectors being associated with the first and second connecting blocks respectively, the electrical connectors being electrically connected with each other via the flexible cable; wherein the connecting unit is removably connected with the first and second housings, the first housing is connected with the first connecting block, the second housing is connected with the second connecting block, and the first housing is pivotable about the second housing via the hinge at either of two sides of the foldable mobile telephone, wherein two projections extend from a first side of the first and second housings respectively, and two projections respectively extend from a second side of the first and second housings respectively, the second sides adjoining the first sides.

2. The foldable mobile telephone as claimed in claimed in 1, wherein a flexible cable extends through one of the turning shafts, the hinge and the other turning shafts, for establishing eletrical connection between the first and housings.

3. The foldable mobile telephone as claimed in claim 1, wherein the first connecting block defines a first channel, and the second connecting block defines a second channel.

4. The foldable mobile telephone as claimed in claim 3, wherein a width of each channel is equal to or slightly larger than a thickness of the corresponding projections.

5. The foldable mobile telephone as claimed in claim 3, wherein the first and second housings respectively define two slots where the first and second sides of the first and second housings adjoin each other.

6. The foldable mobile telephone as claimed in claim 3, wherein each turning shaft comprises a first enlarged end, a second enlarged end and a shaft, the first enlarged end is connected with the second enlarged end through the shaft, the first enlarged ends of the turning shafts are respectively located in the first and second housings and can move therein, the second enlarged ends of the turning shafts are respectively located in the first and second channels and can slide therein, and the shafts of the turning shafts extend out from the slots.

7. The foldable mobile telephone as claimed in claim 6, wherein each of the enlarged ends is substantially a sphere.

8. The foldable mobile telephone as claimed in claim 7, wherein a diameter of each first sphere is larger than a width of the corresponding slot.

9. The foldable mobile telephone as claimed in claim 7, wherein a width of a portion of each channel is smaller than a diameter of the corresponding second sphere, whereby the second sphere cannot transversely escape from the channel.

10. The foldable mobile telephone as claimed in claim 6, wherein the shafts can slide along the channels.

11. The foldable mobile telephone as claimed in claim 3, wherein a distal edge portion of each projection is enlarged.

12. The foldable mobile telephone as claimed in claim 11, wherein an inmost portion of each channel is enlarged, for slidably receiving the distal edge portion of the corresponding projection.

13. The foldable mobile telephone as claimed in claim 3, wherein a bulge is provided on each projection.

14. The foldable mobile telephone as claimed in claim 13, wherein each channel defines a dent for accepting the corresponding bulge.

15. A foldable electronic device comprising: one housing enclosing parts of said foldable electronic device; and another housing enclosing other parts of said foldable electronic device, said another housing disposed next to said one housing and rotatably movable about an axis relative to said one housing between a first location where said one and another housings are placed side by side so as to have a side of said one housing covered by said another housing, and a second location where said another housing rotatably moves away from said one housing about said axis to expose said side of said one housing, said axis being movable relative to said one housing along a periphery of said one housing between at least two positions so that said another housing is capable of moving between said first and second locations thereof when said axis is at each of said at least two positions wherein two projections extend from a first side of the first and second housings respectively, and two projections respectively extend from a second side of the first and second housings respectively, the second sides adjoining the first sides.

16. The foldable electronic device as claimed in claim 15, wherein said axis is defined along a hinge movably connectable to said one and another housings at said each of said at least two positions.

17. A foldable electronic device comprising: one housing enclosing parts of said foldable electronic device; another housing enclosing other parts of said foldable electronic device, said another housing disposed next to said one housing and movable relative to said one housing at one of a first operational location and a second operational location; and at least one keypad formed on said one housing and operationally accessible to users of said foldable electronic device when said another housing is at each of said first and second operational locations, said at least one keypad being operable along a first operationally accessible direction in case that said another housing is at said first operational location, and operable along a second operationally accessible direction different from said first operationally accessible direction in case that said another housing is at said second operational location wherein two projections extend from a first side of the first and second housings respectively, and two projections respectively extend from a second side of the first and second housings respectively, the second sides adjoining the first sides.

18. The foldable electronic device as claimed in claim 17, wherein said first operationally accessible direction is defined along a lengthwise direction of said one housing, and said second operationally accessible direction is defined along a breadthwise direction of said one housing.

19. The foldable electronic device as claimed in claim 17, wherein said another housing is further rotatably movable between a first location where said one and another housings are placed side by side so as to have said at least one keypad of said one housing covered by said another housing, and a second location where said another housing moves away from said one housing to expose said at least one keypad of said one housing to said users.

* * * * *